UNITED STATES PATENT OFFICE.

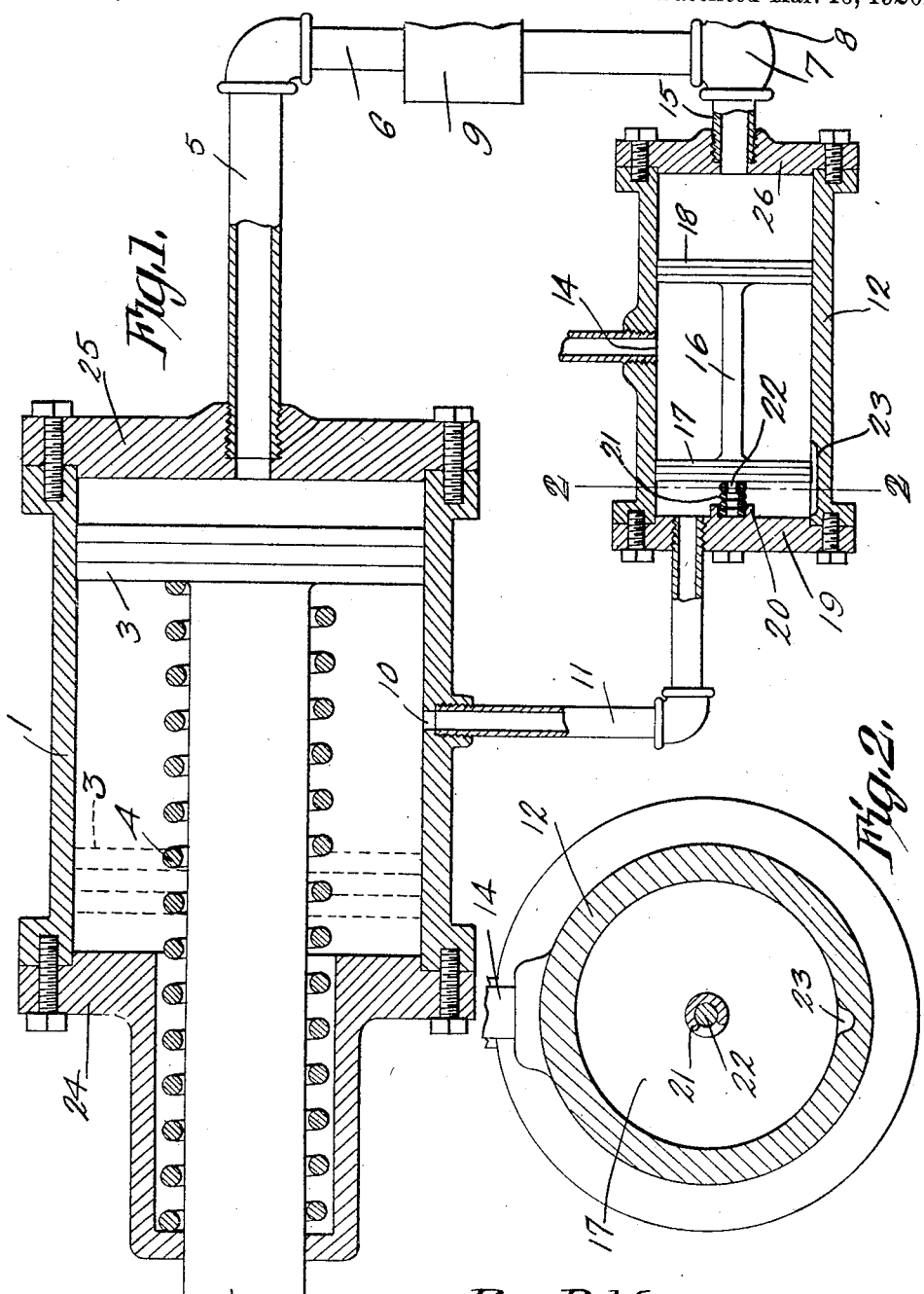

ROY B. MANESS, OF GAINESVILLE, GEORGIA.

VALVE.

1,333,866.  Specification of Letters Patent.  Patented Mar. 16, 1920.

Application filed September 29, 1916. Serial No. 122,890.

*To all whom it may concern:*

Be it known that I, ROY B. MANESS, a citizen of the United States, residing at Gainesville, in the county of Hall and State of Georgia, have invented a new and useful Valve, of which the following is a specification.

By way of explanation it may be stated that the triple valve in an air brake system frequently fails to operate, and as a consequence, the brakes are not released. The wheels of the railway vehicle then slide and are worn flat, a circumstance well within the knowledge of those skilled in the art.

The object of the present invention, in view of the foregoing, is to provide a novel means whereby the brakes will be released partially, should the triple valve prove inoperative.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows diagrammatically, a portion of an air brake system embodying the present invention; and Fig. 2 is a cross section taken on the line 2—2 of Fig. 1.

In the drawings the numeral 1 indicates a brake cylinder including heads 24 and 25. The brake rod appears at 2 and carries a piston head 3 operating in the cylinder 1 and controlled by a compression spring 4. A pipe 5 is connected with the head 25 of the brake cylinder 1 and is connected with a cross over pipe 6 which in its turn is connected with a coupling 7, one end 8 of which may be taken to represent the train line. Interposed in the cross over pipe 6 is the triple valve and reservoir, which are indicated diagrammatically at 9.

In carrying out the present invention, a port 10 is fashioned in the side of the cylinder 1 intermediate the heads 24 and 25 of the cylinder. With the port 10 is connected a pipe 11 leading to one head 19 of a valve cylinder 12, the other head of which is designated by the reference characters 26. The valve cylinder 12 is equipped intermediate its ends with a bleed port 14. A pipe 15 leads from the head 26 of the valve cylinder 12 to the coupling 7. Located within the valve cylinder 12 is a rod 16 provided with piston heads 17 and 18. The head 19 of the valve cylinder 12 may be supplied with a socket 20 or any other suitable means adapted to receive one end of a compression spring 21, the other end of which may be mounted on a pin 22 carried by the head 17. The spring 21 is of such strength that when it is compressed, it will offset twenty pounds of air pressure. In the interior of the valve cylinder 12 is fashioned a longitudinal, transversely restricted by pass duct 23.

When the brakes are applied, the piston head 3 in the cylinder 1 stands between the port 10 and the cylinder head 24. The piston head 17 in the cylinder 12 stands between the bypass duct 23 and the port 14, the spring 21 being expanded. Because the head 17 stands between the bypass duct 23 and the bleed port 14, air can not find an exit through the pipe 11 and the bleed port 14.

Suppose that it is desired to release the brakes and suppose also that the triple valve 9 fails to work when the train pipe pressure is increased, the auxiliary pressure still holding the piston head 3 between the port 10 and the cylinder head 24. When, the train pipe pressure is increased, the pressure to the right of the head 18 is greater than the pressure to the left of the head 17, this last specified pressure being due to brake cylinder pressure communicated through the pipe 11, added to the action of the spring 21. The parts 17—16—18 will then move to the left, under the increased train pipe pressure, the head 17 assuming the position shown in Fig. 1 and standing between the ends of the by-pass duct 23. The air which is in the cylinder 1, to the right of the piston 3 will now flow through the pipe 11 to the cylinder 12 adjacent the head 19 and will flow around the edge of head 17, through the duct 23, and pass away by the bleed port 14, a partial release of the brakes thus being secured, even though the triple valve 9 may have proven inoperative to relieve the auxiliary pressure on the piston head 3.

Suppose that, as is common in the brake equipment of freight cars, the piston 3 moves eight inches toward the head 25 to secure a full release of the brakes. Suppose, also, that the port 10 is located four inches from the position which the piston 3 assumes when the brakes are fully applied. Then, although the pressure in the cylinder 1 to the right of the piston 3, may be relieved through no more than one half of the travel of the piston 3, from a position where the brakes are set fully to a position where the brakes are released completely, the brakes nevertheless will be released enough so that the wheels will not slide and be worn flat, the object stated in the opening portion of the specification being attained.

Having thus described the invention, what is claimed is:—

In an air brake system, a brake cylinder; a brake piston working therein; a train line communicating with the brake cylinder; a triple valve in the train line; a conduit bridged around the triple valve between the brake cylinder and the train line; a valve casing in the conduit and provided in its inner wall with a longitudinal bypass duct; and a piston in the valve casing and responsive to releasing pressure in the train line, the piston comprising heads and a reduced connection uniting the heads, the thickness of one head being less than the length of the bypass duct, the casing being provided with a bleed port located between the heads.

In testimony that I claim the foregoing as my own, I have hereto affixed my signature in the presence of two witnesses.

ROY B. MANESS.

Witnesses:
C. O. WALLIS,
A. S. RICHARDSON.